Feb. 27, 1962          H. S. VATH          3,022,721

BASTING DISPENSER FOR COOKING

Filed Feb. 9, 1959

INVENTOR

HERMANN S. VATH

BY Robert L. Dunn,

ATTORNEY

United States Patent Office 3,022,721
Patented Feb. 27, 1962

3,022,721
BASTING DISPENSER FOR COOKING
Hermann S. Vath, P.O. Box 686, Mountain View, Calif.
Filed Feb. 9, 1959, Ser. No. 791,921
5 Claims. (Cl. 99—345)

This invention relates to cookery and deals with a basting dispenser for applying basting over meats while cooking.

Although the description and the drawing are directed to a device designed especially for use with special barbecue, it will be apparent that the same device with slight modification could be used with satisfactory results in large ovens or open barbecues.

The primary object of the invention hereinafter described and claimed is to provide a means for dispensing basting over means during cooking, particularly when using small barbecues.

The small barbecue has taken a more or less conventional design which consists of a fuel pan having a hood extending over part of the pan. The hood has its various advantages which are obvious and I make further use of it to mount a basting dispenser over the meat so that the basting may be applied to various parts of the meat and the amount also may be controlled at various points along the meat as it rotates on the spit. The means for mounting the dispenser on the hood has several adjustments for positioning the dispenser to meet the requirements of a chef or cook.

Briefly stated, the invention amounts to supporting a tray or trough above the meat, in such a manner that it may be raised or lowered with respect to the meat, or moved backward or forward to bring the basting on the meat as desired. The trough itself carries the basting which is dispensed through small holes in the bottom and the amount dispensed is controlled by an adjustable needle valve for each hole. The combination of the adjustable mounting for the dispenser and the means for adjusting the flow of the basting through the dispenser provide a basting dispenser that will find a great deal of usefulness not only in the barbecue technique of cookery, but also in large kitchens where roasting is done in large ovens.

Other objects and advantages will become apparent as the description proceeds in conjunction with the drawing in which.

Figure 1:
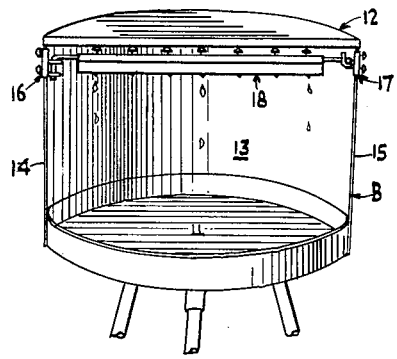
FIG. 1 is a side perspective view of a barbecue showing my dispenser in place.
Figure 2:
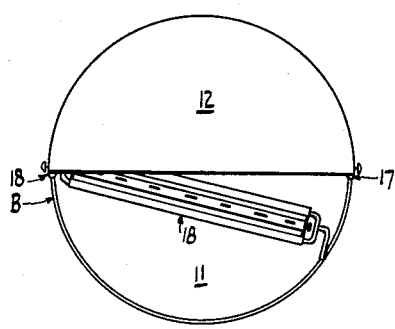
FIG. 2 is a top view of the same, with the dispenser swung on one of its pivots for adjustment or refilling.

Referring to the drawing, it can be seen that I have shown my invention as applied to a conventional barbecue, generally designated B. In using such a barbecue, for roasting meats of all kinds, it is customary to use a spit for mounting the meat above the fuel. The split ordinarily is rotatable and is generally rotated by power, but not necessarily so. Since the spit is no part of this invention, I have not shown it.

The barbecue, as stated, consists of two essential parts, the fuel pan 11, and the hood 12. In this particular type or barbecue the fuel pan is circular and the hood is a semicircular cover mounted directly over the pan and comprises a circular vertical back wall 13 ending in straight edges 14 and 15. On these straight edges, I mount clamps generally designated 16 and 17 respectively. These clamps are for the purpose of supporting a basting dispenser tray or trough generally designated 18, on the edges 14 and 15, in various positions.

Figure 3:
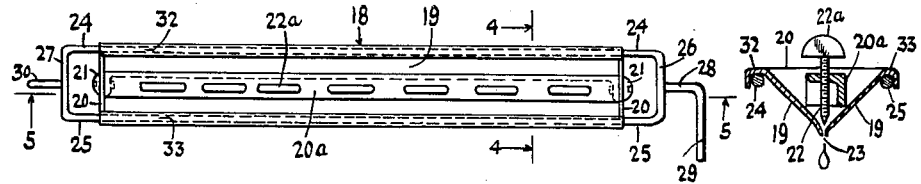
FIG. 3 is an enlarged top plan view of the dispenser.
Figure 4:
FIG. 4 is an enlarged cross section taken on lines 4—4 of FIG. 3.
Figure 5:
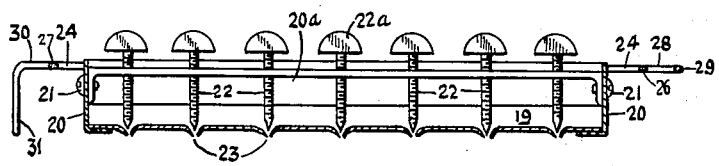
FIG. 5 is a longitudinal section taken on line 5—5 of FIG. 3.

The dispenser trough, generally designated 18, has been shown in detail in FIGS. 3, 4, and 5. As seen here, it comprises an elongated trough 19, having its ends closed by cross members 20. Down the center of the trough I mount an angle iron 20a which is attached to each end by a screw threaded bolt 21 and in this angle iron I mount a series of screw threaded bolts 22 having needle points and thumb screw heads 22a. Directly beneath each needle point I form a hole 23 in the bottom of the trough adapted to receive the needle point of the bolt and form a needle valve therewith.

The means for mounting the trough on the hood consists of two clamps, generally designated 16 and 17 and a specially formed frame extending between the two clamps. Taking up first the frame. In FIGS. 3, 4, and 5, it can be seen that this member consists of two longitudinal rods 24 and 25, connected at their ends by cross rods 26 and 27. From the central portion of the cross rod 26, a rod 28 extends outwardly a short distance and is then bent to form a section 29 substantially in the plane of the longitudinal rods 24 and 25. On the cross rod 27 a rod 30 extends outwardly a short distance, similar to the rod 28 and is then bent at a right angle to form a section 31 substantially at a right angle to the plane of the rods 24 and 25.

Referring now to FIG. 4 is can be seen how the trough 18 is mounted on the rod frame. Here it will be seen that the trough on the upper open side has an extension 32 and 33 on each respective side. These extensions are made to extend over and engage the rods 24 and 25 respectively for supporting the trough on the rods. It will be noted, the trough is somewhat shorter than the rods 24 and 25 thus allowing an adjusting movement of the trough along the rods.

Figure 6:
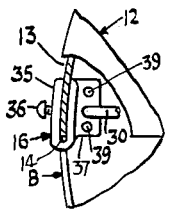
FIG. 6 is an enlarged fragmentary top plan view of one of the clamps for mounting the dispenser on the hood of the barbecue.
Figure 7:
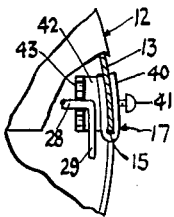
FIG. 7 is an enlarged fragmentary top plan view of the other clamp for mounting the dispenser on the hood of the barbecue.
Figure 8:
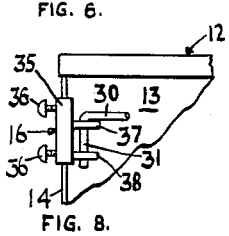
FIG. 8 is a front elevation of FIG. 6.
Figure 9:
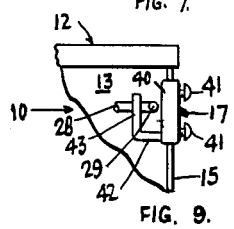
FIG. 9 is a front elevation of FIG. 7.
Figure 10:
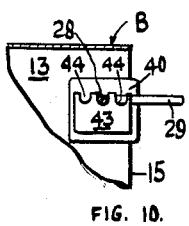
FIG. 10 is a view of FIG. 9, taken in the direction of the arrow 10.

The rod frame in turn is supported on the clamps 16 and 17, which are detachably mounted on the front edges of the hood 12. As shown, these clamps are different for reasons to be explained. In FIG. 6 I have shown a top view of the clamp 16 as it appears when attached to the front edge 14 of the hood 12. It will be observed that this clamp consists of a U-shaped member 35 adapted to fit over the front edge 14 of the wall 13. On the outside of the clamp I provide a pair of thumb screws 36 for holding the clamp on the wall in adjustable positions. On the inside of the clamp I form two outstanding flanges 37 and 38. Each of these flanges has a plurality of vertically aligned holes 39 adapted to receive the section 31 of the rod supporting frame and support it in a swingable position.

The clamp 18, as stated, is somewhat different from the preceding description; however, it does have a U shaped member 40 adapted to fit over the edge 15 of the vertical wall 13 and be held in place by thumb screws 41 in the same manner as the clamp 16. On the inside of this clamp I provide an extending member 42 which is bent upwardly to form an upstanding section 43 on the top of which are formed a series of notches 44 adapted to receive and support the rod 28. Under the foregoing arrangement, the dispensing tray 18 may be held in various positions up and down the front edge of the hood by means of the set screws 36 and 41 on the clamps 16 and 17 respectively, thus regulating the distance from the dispenser to the meat. By use of the holes 39 and the notches 44, the dispenser may be moved in or out with respect to the hood. In addition, the trough 19 may be slid along the rods 24 and 25 to change the longitudinal position of the dispenser, and finally, the amount of liquid dispensed at each point along the trough may be controlled by adjusting the thumb screws 22.

The overall result is a basting dispenser that will meet the meticulous requirements of amateur cooks and/or accredited chefs.

I claim:

1. For use with a barbecue having a hood including a back wall ending in spaced front edges, a basting dispenser, means mounting said dispenser on the front edges of said wall, said means including a clamp on each of said front edges, one of said clamps having a hole therein, and the other having a notch thereon, means for supporting said dispenser on said clamps, said means including an elongated substantially rectangular frame supporting said dispenser, said frame having a rod extending from one end thereof with the end of said rod extending downwardly into said hole in the aforementioned clamp to form a pivot point for said frame, the other end of said frame having a rod extending therefrom engaging the notch on the other of said aforementioned clamps to support the free end of said frame, with the end of said rod being shaped to extend substantially at right angles to said frame to form a hand grip for removing the free end of said frame from said clamp and swing said frame on said pivot point.

2. Claim 1 wherein there are a plurality of said holes and notches in said mentioned clamps respectively whereby the pivot point and the free end support for said frame may be moved inwardly and outwardly with respect to said hood to change the position of said dispenser.

3. Claim 1 and in addition thereto, means for fixing said clamps in vertically adjustable positions on said front edges.

4. For use with a barbecue having a hood with a back wall ending in spaced front edges, a basting dispenser, means mounting said dispenser on said front edges, said basting dispenser comprising a V-shaped trough closed at both ends and having a plurality of holes spaced in the bottom thereof, a bar running from end to end of said trough, said bar having a plurality of screw threaded holes therein spaced to coincide with the holes in the bottom of the trough, and a screw threaded, needle-pointed member in each of said screw threaded holes for regulating the flow of basting through the holes in said trough, said members having thumb screw heads for turning the same.

5. In combination with a barbecue of the character described having a fuel pan with a hood over a portion of said fuel pan, said hood being supported on a wall extending from said fuel pan to said hood, a trough for dispensing a liquid basting over meat being cooked in said barbecue, means for adjustably dispensing basting from said trough, means adjustably mounting said trough on said wall, said last mentioned means including a pair of clamps, each having a slot therein mounted over respective front edges of said wall, a set screw on said clamps fixing said clamps in vertically adjustable positions on said wall, means on said clamps supporting a frame therebetween, said frame having spaced longitudinal rods engaging opposite sides of said trough and slidably support the same thereon, means pivotally mounting one end of said frame on one of said clamps and means detachably supporting the other end of said frame on the other of said clamps.

References Cited in the file of this patent

UNITED STATES PATENTS

| 180,021 | Goldsmith | July 18, 1876 |
| 831,088 | McCaughey | Sept. 18, 1906 |
| 1,380,656 | Lauth | June 7, 1921 |
| 1,460,486 | Harvey | July 3, 1923 |
| 2,705,450 | Steinbook | Apr. 5, 1955 |
| 2,831,728 | Notz | Apr. 22, 1958 |

FOREIGN PATENTS

| 21,427 | Great Britain | Oct. 26, 1899 |
| 330,356 | France | June 25, 1903 |
| 1,099,624 | France | Mar. 23, 1955 |